Patented Oct. 6, 1936

2,056,459

UNITED STATES PATENT OFFICE 2,056,459

PLASTIC MATERIALS

Arthur M. Howald and James L. Rodgers, Jr., Toledo, Ohio, assignors, by mesne assignments, to Plaskon Company, Incorporated, a corporation of Delaware No Drawing. Application August 10, 1933,
Serial No. 684,606

4 Claims. (Cl. 106—22)

This invention relates to plastic materials; and it comprises a method of making a dry powdery material which can be molded, extruded and the like, wherein an aqueous solution of formaldehyde-urea reaction products is prepared, reaction being carried on only to the point where the liquid is still mobile, the liquid is taken up in fibrous nitrated cellulose and water is evaporated from the mixture by low temperature drying; and it further comprises the product of the process, such product being a fine, completely dry mixture of fibrous nitrocellulose impregnated with dry reaction products of urea and formaldehyde, dried in situ; said mixture being adapted to be homogenized by the application of heat or by the use of a liquid dissolving both the nitrocellulose and the condensation product; all as more fully hereinafter set forth and as claimed.

The quality of plastic materials containing condensation products of urea and aldehydes is affected by numerous considerations, important among which is the relative amount of water present in the moldable materials and in articles made therefrom. In hot molding all water present must be expelled and the presence of any water is undesirable. Sources of such water are the water in which the aldehyde forming one of the starting constituents is held in solution, water formed as one of the produts of reaction between the aldehyde and the urea, water of condition in fillers, water absorbed from the atmosphere by the moldable material during processing and storage, and water absorbed by the molded articles from the atmosphere or as the result of wetting. Water may be abstracted from the atmosphere or taken up as the result of immersion both by the resinous material per se and by the filler material.

It is an important object achieved in our invention to provide a plastic material the water content of which may be reduced to a minimum with greater ease and more certainty than has hitherto been possible.

It is another important object achieved in our invention to provide a plastic material containing a urea and aldehyde reaction product the tenency of which material to take up water either before or after final hardening to produce hard articles may be minimized to an extent hitherto impracticable.

A further result of our invention is the provision of a plastic material comprising a resinous condensation product and a fibrous filler, both of which are soluble in the same organic solvent.

An important result of our invention is the provision of commercially practicable process steps for making the materials mentioned. In the present invention, a composite material is made having a filler of a nitrated form of cellulose and a binder composed of urea-formaldehyde condensation product. Both these materials are sensitive to the action of heat and the urea-formaldehyde condensation products are usually made in aqueous solution. It has been found that by the expedient of using fibrous nitrocellulose to take up the liquid, the water can be effectively removed by low temperature evaporation without damaging either component of the composition. The composition is a fibrous material. On heating it molds readily; often becoming homogeneous; the two components plasticizing each other.

Other results and advantages of our invention will appear as the detailed description thereof proceeds.

Workers in this art have employed various means for reducing water content of the wet mushes, gels, pastes, sirups and liquids primarily produced by the interaction of urea and formaldehyde, used as the ordinary commercial 40 per cent solution. As a rule, water is removed by ordinary boiling, by distillation under vacuum or, with hard materials, ordinary drying after molding. Spray drying and drying upon heated rotating cylinders from which the material is subsequently scraped have been proposed and are desirable with some liquid materials for some purposes. In all these methods, where high temperature or long continued heating are used, it is found that the condensation products change in an undesirable way; there is too much polymerization and the products are, to that extent, less desirable in molding.

In making molded articles including a filler, one of the present applicants (Howald) in a prior invention provided a method whereby reaction products of urea and formaldehyde in solution in a thin, mobile, aqueous liquid, are taken up on sulfite paper pulp which will serve as a filler in the final molded articles. When thus taken up, there is effected a great expansion of surface of the liquid and rapid evaporation can take place without subjecting the material to elevated temperatures. Not only is large surface exposed to passing air, but the loose fibrous material readily permits passage of moisture to the surface by a sort of wick action. This method is outstandingly efficacious and the reaction products which are produced by processes including this step are believed different from and superior to any reaction products which can be produced by processes in which evaporation of water of solution is not effected with the same rapidity and at the same low temperatures. Great surface distribution and capillary action make it possible to get rid of the water without accelerating the reaction by heat and thereby solve the problem of getting rid of the water without losing control of the reaction or permitting it to proceed too far toward the hardening stage. In fact the reaction product, when the water of solution has been thus evaporated from the fibrous filler impregnated with a thin and mobile solution of the substances resulting from the first stages of interaction between formaldehyde and urea, may remain completely soluble not only in water but in organic solvents such as methanol and glycol ethers.

Not only may the aqueous solvent of the urea and the aldehyde primary reaction products be thus evaporated without undesirable carrying forward of reactions, but by the use of proper temperature and humidity in the drier most of the moisture which was contained in the fibrous filler may also be abstracted. Sulphite pulp and similar cellulose products contain water of condition and this must be removed in the drying operation, as well as the water of the aqueous solution employed. The operation removes the water of condition of the fiber. Such a thorough drying of both the reaction product and of the filler is highly desirable, but with fillers heretofore employed, and particularly paper pulp, it has had the disadvantage of rendering the material more avid to absorb moisture both before and after molding. A great deal of the moisture thus absorbed is taken up by the filler. We have discovered that by using fibrous nitrated cellulose first as an absorbent of the liquid to provide the surface area and wick effect necessary for rapid evaporation at low temperatures and, secondly, to act as a filler subsequently, the hygroscopic quality of the material both before and after molding is greatly reduced and, therefore, that the keeping qualities of the unmolded material and the durability of molded articles made therefrom are much better than the corresponding qualities of aldehyde-urea plastics using ordinary un-nitrated fiber heretofore known. In nitrated forms of cellulose the products exhibit little attraction for atmospheric moisture; there is but little water of condition. Water of condition is tenaciously held by ordinary cellulose fiber and by using nitrated fiber not only is there less water to be removed, but drying is easier. And the final dry product, such as a molding powder, is considerably less hygroscopic.

We have found that the time required for hardening the urea-formaldehyde reaction product in the mold is somewhat less when nitrated cellulose is used as a filler than the time required for hardening urea-formaldehyde reaction product with un-nitrated cellulose used as a filler.

We have also discovered that impregnation of ordinarily inflammable and explosive nitrated cellulose by a urea-formaldehyde reaction product produces a composition which is fire resistant and detonation proof; in which the ordinary rapid burning of pyroxylin and its risk of explosion substantially disappear. The fireproofed nitrated cellulose may be plasticized by camphor or other "latent solvent" like ordinary nitrocellulose. In making plastics with the aid of camphor, etc., the fire resistant character of the material is valuable during processing as well as in the finished article.

Evaporation of the solution on a nitrated fibrous filler can be used in making a dried composition all of the ingredients of which are soluble in methanol-ethyl acetate mixtures, or the monomethyl ether of ethylene glycol. Hence, by simply dissolving the dried impregnated fibrous nitrated cellulose in a suitable solvent mixture a urea-formaldehyde cellulose nitrate lacquer is produced. By employing and afterwards removing a volatile solvent which may be evaporated at low temperatures, the solvent may be evaporated without unduly carrying forward the urea-formaldehyde reaction, thus producing a molding material in which a heat hardening urea-formaldehyde complex is plasticized and made thermoplastic by the nitrocellulose.

The plastic thus produced by our new process is not to be confused with plastics made by mixing a nitrocellulose plastic with a urea-formaldehyde plastic which has been made separately. By evaporating an aqueous solution of the primary urea-formaldehyde products on the nitrated cellulose, a more intimate type of union is effected than can be secured by mechanical intermixture of the two. There is apparently an interaction. If the water of solution be evaporated from a separately made urea-formaldehyde plastic by other means and mechanical mixture with pyroxylin made, the resulting plastic is inferior. Any other filler than nitrated cellulose employed in aiding in evaporation of water from an aqueous solution of primary reaction products, finally remains as a separate and solid phase in the final hardened plastic. The product of the present invention possesses superior water resisting properties, not only while it is in the state of a moldable material such as a molding powder but after molding, whether or not the fibrous nitrated cellulose has been converted into a thermoplastic, non-fibrous ingredient. The dried molding powder keeps better and requires less protection against the action of the air. The hardened hot molded product is less hygroscopic. An accelerated test with boiling water shows even better resistance than can be obtained from similar articles made with plain fiber. The rate of water absorption of the nitrocellulose constituent as determined by actual test is only about 25 per cent as great as the rate of water absorption of a superior grade of sulfite pulp filler in an otherwise similar resin. The ultimate absorption on saturation of the nitrocellulose filler is only about one-half that of high-grade sulfite pulp filler contained in similar resins. The new plastic also possesses superior mold flow characteristics, great resistance to shock and, when the operation is so conducted as to make a single-phase composition, that is when the nitrated cellulose and the urea-formaldehyde reaction product go into mutual solution; products can be obtained of beautiful transparency and high quality. They differ in many respects from any of the molded or extruded transparent articles of the prior art.

Regarding our new plastic as a nitrocellulose compound treated with a urea-formaldehyde reaction product, the urea-formaldehyde reaction product acts as a fire and detonation damper as well as improving the hardness, working qualities and durability of the compound and enhancing the appearance of the final product. Pyroxylin is often colloided with various plasticizers or "latent solvents", such as camphor, to give shaped articles. Pyroxylin colloided with urea-formaldehyde reaction products gives articles which, in many respects, are even better.

The proportions of the constituents of our new plastic compound may vary, the specific proportions employed depending upon which of such characteristics as speed of molding, workability, water resistance and shock resistance is considered most important in any particular product or any particular batch. We produce a product having such desirable characteristics in well balanced, high degree by the following process which may be regarded as a specific embodiment of the present invention.

The acidity of 1,000 pounds of 37 per cent commercial aqueous formaldehyde solution is adjusted to pH of 6.4 by the addition of triethanolamine. Five hundred pounds of 96 per cent fertilizer urea is added to the solution. The amounts of formaldehyde and urea employed correspond to a molar ratio of approximately 1.5:1. The solution is clarified by filtering and is allowed to stand at room temperature for 12 hours. Five hundred pounds of nitrated cellulose pulp is then added and the mixture is beaten in a mixer until the pulp is thoroughly shredded and uniformly impregnated with the solution. The acidity of the pulp having been predetermined, sufficient phthalic acid solution is added, preferably before the addition of the pulp, to bring the acidity of the mixture after addition of the pulp to pH of 5.4. From the mixer the wet pulp is transferred to a drier, preferably of the conveyor type, where it is dried at wet bulb temperatures ranging from 22° C. to 40° C.

The material at this stage consists of small dry, porous wads. In this state it is transferred to a ball mill for grinding. The temperature during grinding is preferably kept at or below 40° C. Before the completion of grinding a substance which acts as a lubricant in molding, such as zinc stearate, is added. The powder thus produced may be hot molded without further processing, but we usually first compact it by warming and kneading, then grinding the material until it passes a standard 8-mesh screen. The material thus compacted is more easily handled than the impalpable powder which comes from the ball mill.

Whether stored in powder form or compacted granular form, the keeping properties of the material are excellent. Its hygroscopic tendency is much less than that of material having an unnitrated cellulose filler; hence atmospheric moisture need not be so rigorously excluded from the material of our invention during grinding, compacting and storing. The molding qualities of the material made according to the above described process are similar to the molding properties of material containing unnitrated cellulose filler. It is free from risk of a deleterious swelling and shrinking caused by absorption of moisture when humidity is high and drying out when humidity is low.

The material including both the formaldehyde-urea intermediate reaction product and the nitrated cellulose filler may be dissolved in methyl cellosolve either in its dried wad state, its powdered state or its granulated state, thus providing, through uniform molecular distribution of constituents, a perfectly homogeneous body capable of use as a lacquer or by concentration with elimination of the solvent of forming a moldable plastic having characteristics somewhat different from those of the material containing the nitrated cellulose in fibrous form. The cellulose nitrate in the material formed by evaporation of the solvent acts as a plasticizer rather than as a filler.

The fibrous nitrated cellulose may be converted to any desired extent into non-fibrous form by the use of more or less solvent. A considerable transformation can be effected by only slightly moistening the urea-formaldehyde impregnated nitrated cellulose fiber with a suitable solvent, and if the moistened fiber be kneaded or worked before evaporation of the solvent, the transforming effect is greatly augmented.

If the solvent be evaporated from a homogeneous urea-formaldehyde cellulose nitrate mixture having a pH of 5.4, the heat setting characteristics of the urea-formaldehyde predominate and the composition as a whole is thermosetting. If the solvent be evaporated from a homogeneous mixture having a pH of 7 or more, the urea-formaldehyde fraction is not quickly thermohardening and consequently the mixture as a whole is permanently thermoplastic. A thermohardening urea-formaldehyde nitrocellulose mixture can be converted into a thermoplastic mixture by grinding into it from 0.3 per cent to 1 per cent by weight of a weak organic base such as hexamethylenetetramine or triethanolamine, and conversely, an organic acid may be added to the thermoplastic composition to convert it into a thermohardening composition. The urea-formaldehyde fraction, when the alkalinity of the composition sufficiently retards heat hardening, acts as a plasticizer for the nitrocellulose as well as a fire and explosion damper.

Owing to its perfect homogeneity and greater fluidity in the mold, the light transmitting properties of the cellulose nitrate plasticized urea-formaldehyde resin are exceptional.

It possesses to a considerable extent the desirable properties of celluloid compounds and is at the same time fire resistant and explosive proof and not liable to deformation under heat below temperatures of decomposition.

The water resisting properties both of the material and the final product can be increased by slightly increasing the urea content, beyond the amount given in the example; by increasing the proportion of urea initially employed, by initially adding thiourea, or by adding urea or thiourea during the urea-formaldehyde solution standing period.

Thiourea and/or other ureas or substituted ureas, ammonium cyanates and thiocyanates, cyanamid and dicyandiamid are to be regarded as equivalents of urea and other aldehydes and aldehyde forming compounds are to be regarded as equivalents of formaldehyde in the practice of our invention and the terms "urea" and "formaldehyde" as employed in the subjoined claims are intended to include these and other equivalents. It is to be understood that the process and products specifically described herein are illustrative only and that our invention in its broad aspect includes all resins of the urea-aldehyde type and processes of making them wherein cellulose nitrate is employed as a filler or dissolved subsequent to its incorporation with a urea-aldehyde resin.

Nitrated cellulose is less hygroscopic, it contains less water of condition or regain than ordinary cellulose. To some extent, this loss in water of condition increases with the degree of nitration. We contemplate cellulose of any degree of nitration. Low nitrated cellulose and even woody fiber, with an average nitration less than that of cellulose dinitrate is useful. Highly nitrated nitrocellulose is also useful.

The acetyl celluloses display a similar loss of water of condition, or a diminution in hygroscopicity, attendant on the combination of the acetic acid radicle with the cellulose molecule. Various commercial cellulose acetates can be used in the present invention in lieu of nitrocellulose with the production of new and useful plastics with characteristic relation to solvents. However, these compositions containing cellulose acetate have in common with those previously described, an increased resistance to water. Like the nitrocelluloses, the fibrous acetyl celluloses used for incorporation with mobile urea-formaldehyde solutions aid in securing quick extrication of water by evaporation; and they can serve in the final plastic, either as a filler or as a plasticizer. In any event, the molding powder and the molded plastic are less hygroscopic than where ordinary cellulose is used.

Other cellulose esters than the nitrate and the acetate can be used with similar results so far as lessening hygroscopicity is concerned.

What we claim is:—

1. As a new and improved composition of matter an intermediate, relatively non-hygroscopic, product suitable both in preparing molding powders adaptable for hot pressing and in making composite lacquers and varnishes, said intermediate product comprising a dry, porous mass of fibrous nitrated cellulose coated with dry fusible urea-formaldehyde reaction product, said coated fibrous mass being uniformly soluble in the monomethyl ether of ethylene glycol and other varnish solvents and being convertible by hot pressing into hardened, shaped products having a high translucency.

2. As an improvement in the manufacture of coatings and shaped articles containing urea-formaldehyde products and cellulose esters, the process which comprises wetting fibrous nitrated cellulose with a mobile aqueous solution of urea-formaldehyde reaction products, evaporating off the water at a temperature insufficient to harden said urea-formaldehyde reaction product to form a dry porous relatively non-hygroscopic mass of fibrous nitrated cellulose coated with a dry, soluble, fusible urea-formaldehyde product, said coated fibrous mass being uniformly soluble in organic varnish solvents, and then homogenizing the said dry coated fibrous mass to obliterate the fibrous form of the said nitrated cellulose and obtain a homogeneous uniform composition by the successive action of a small amount of a plasticizing solvent capable of dissolving both the nitrated cellulose and the urea-formaldehyde product and of heat, the said dry coated fibrous mass being slightly moistened with sufficient of said organic solvent to produce a plastic uniform composition upon the subsequent application of heat.

3. As a new composition of matter adaptable for plastic and similar purposes, a dry porous mass of a fibrous nonhygroscopic cellulose esters of the class consisting of nitrocellulose and cellulose acetate, impregnated with a dry fusible water soluble reaction product of urea and formaldehyde, the said dry impregnated fibrous mass being uniformly soluble in the mono-methyl ether of ethylene glycol and other varnish solvents and being convertible by hot pressing into hardened, shaped products having a high translucency.

4. In the manufacture of improved compositions containing urea-formaldehyde products and non-hygroscopic cellulose esters, the steps which comprise adding triethanolamine to a commercial aqueous formaldehyde solution to adjust the acidity thereof to pH 6.4, dissolving in the slightly acid aqueous formaldehyde solution so obtained sufficient urea to give a molar ratio of formaldehyde to urea of approximately 1.5:1, allowing the said solution to stand at room temperature until the urea has reacted with the formaldehyde and a urea-formaldehyde reaction product is formed, adding sufficient phthalic acid solution to adjust the pH to 5.4 and sufficient fibrous nitrocellulose to produce, on drying, a dry porous fibrous mass, mixing the said materials until said nitrated cellulose is thoroughly shredded and uniformly impregnated with the said solution, drying the slightly acid impregnated mass so obtained at wet bulb temperatures ranging from 22 to 40° C., to produce a dry, porous mass of fibrous nitrated cellulose impregnated with dry soluble fusible urea-formaldehyde reaction product, the said dry, impregnated fibrous mass being uniformly soluble in the methyl ether of ethylene glycol and other varnish solvents, and being convertible by hot pressing into hardened, shaped products having a high translucency.

ARTHUR M. HOWALD.
JAMES L. RODGERS, Jr.